(12) United States Patent
Bell, Jr. et al.

(10) Patent No.: US 7,808,880 B2
(45) Date of Patent: *Oct. 5, 2010

(54) OPTICAL DISK DRIVE WITH HYBRID SOLID IMMERSION OBJECTIVE LENS

(75) Inventors: Bernard W. Bell, Jr., Lafayette, CO (US); Scott Wilson, Westminster, CO (US); David H. Davies, Boulder, CO (US); David L. Blankenbeckler, Longmont, CO (US)

(73) Assignee: DPHI Acquisitions, Inc., Longmont, CO (US)

( * ) Notice: Subject to any disclaimer, the term of this patent is extended or adjusted under 35 U.S.C. 154(b) by 731 days.

This patent is subject to a terminal disclaimer.

(21) Appl. No.: 11/549,969

(22) Filed: Oct. 16, 2006

(65) Prior Publication Data
US 2007/0127328 A1    Jun. 7, 2007

Related U.S. Application Data

(63) Continuation-in-part of application No. 11/148,140, filed on Jun. 8, 2005.

(51) Int. Cl.
*G11B 7/00* (2006.01)

(52) U.S. Cl. ............... 369/121; 369/112.23; 369/44.19

(58) Field of Classification Search ............ None
See application file for complete search history.

(56) References Cited

U.S. PATENT DOCUMENTS

| | | | | |
|---|---|---|---|---|
| 5,448,548 A | * | 9/1995 | Taneya et al. | ............... 369/121 |
| 5,832,009 A | * | 11/1998 | Kikuchi | ........................ 372/21 |
| 5,978,139 A | * | 11/1999 | Hatakoshi et al. | ........... 359/565 |
| 6,041,031 A | * | 3/2000 | Ichimura et al. | ......... 369/13.32 |
| 6,069,853 A | | 5/2000 | Novotny et al. | |
| 6,114,689 A | * | 9/2000 | Cho et al. | .................... 250/216 |
| 6,160,769 A | | 12/2000 | Ohnuki et al. | |
| 6,243,350 B1 | | 6/2001 | Knight et al. | |
| 6,396,789 B1 | * | 5/2002 | Guerra et al. | .......... 369/112.01 |
| 6,441,359 B1 | * | 8/2002 | Cozier et al. | ................ 250/216 |
| 6,724,694 B2 | * | 4/2004 | Knight et al. | ............ 369/13.55 |
| 6,762,978 B2 | * | 7/2004 | Mishima et al. | .......... 369/13.32 |
| 6,791,755 B2 | * | 9/2004 | Hatano et al. | ............... 359/565 |
| 7,184,386 B2 | * | 2/2007 | Nikolai et al. | .......... 369/112.09 |
| 7,239,597 B2 | * | 7/2007 | Kim | ...................... 369/112.23 |
| 7,388,823 B2 | * | 6/2008 | Nakata | ....................... 369/116 |

* cited by examiner

*Primary Examiner*—Wayne Young
*Assistant Examiner*—Adam R Giesy
(74) *Attorney, Agent, or Firm*—Haynes & Boone, LLP.

(57) ABSTRACT

A small form factor optical disk drive is provided that incorporates a hybrid solid immersion objective lens (SIOL). The SIOL includes a central aspheric lens portion and a surrounding diffractive optical element portion.

10 Claims, 4 Drawing Sheets

OPTICAL DISK DRIVE WITH HYBRID SOLID IMMERSION OBJECTIVE LENS

RELATED APPLICATION

This application is a continuation-in-part of U.S. application Ser. No. 11/148,140, filed Jun. 8, 2005, entitled "Optical Disk Drive with Micro-SIL."

TECHNICAL FIELD

This invention relates to a hybrid solid immersion/objective lens (SIOL) and to a corresponding optical disk drive incorporating the hybrid SIOL.

BACKGROUND

Many barriers exist to minimizing the form factor of optical disk drives. For example, conventional optical disk drives such as a CD-ROM drive are configured for use with "second surface" optical disks. In a second surface optical disk, the information layer is covered by a relatively thick protective layer or substrate that is hundreds of microns in thickness. Considering that conventional laser light used to read and write in optical drives has a wavelength in the range of from around 400 to 800 nanometers, the relatively thick protective layer is thus many wavelengths in thickness. As such, imperfections such as scratches, dust, and fingerprints on the surface of the protective layer are defocused with respect to the underlying information layer. In this fashion, CD-ROMs and other second surface disks may be handled by users and exposed to dusty environments without needing a protective cartridge.

Although the use of second surface disks provides this advantageous defocusing property, it is also accompanied by certain drawbacks. For example, the relatively thick protective layer covering the information layer introduces significant optical aberrations and wave front distortions. In turn, these optical problems place a floor on the achievable feature size in the information layer, thereby limiting data capacity. However, as the optical disk size is reduced, it is important to minimize feature size in the information layer to provide significant data storage capability despite the presence of a relatively small information layer area. To achieve a significant data capacity within a small form factor optical disk drive, the present assignee has developed first surface optical disks such as disclosed in U.S. Ser. No. 10/891,173, filed Jul. 13, 2004, which is a divisional application of U.S. Ser. No. 09/315,398, filed May 20, 1999, now abandoned, the contents of both applications being incorporated by reference herein in their entirety. In these first surface disks, an information layer covers a substrate, which may be formed to define one or both of a read-only and a writeable area. Advantageously, the information layer may be formed from a continuous phase-change material such as, for example, an SbInS or GeTe—Sb2Te3-Sb so that the formation of the read-only and writeable areas (if both exist) requires no masking or other complicated manufacturing processes. The surface of the information layer may be covered with an optical coupling layer formed from a sputtered dielectric such as silicon oxynitride or a spin-coated-high-refractive-index nano-particle dispersed material for instance. The optical coupling layer does not introduce the aberrations and wave front distortions that the protective layer in second surface optical disks does such that the feature size may be substantially reduced. In this fashion, a significant data capacity is achieved despite the presence of a small form factor.

The present assignee also developed a small form factor optical disk drive for use with the inventive first surface optical disks. For example, U.S. Ser. No. 09/950,378, filed Sep. 10, 2001, discloses an optical disk drive having an actuator arm with an optical pick-up unit (OPU) mounted on one end. Turning now to FIG. 1, an exemplary actuator arm 104 is illustrated. The actuator arm includes an optical pickup unit (OPU) 103 at one end. By rotating about an axis B through a spindle 105, the actuator arm may move the OPU radially with respect to an optical disk (not illustrated). As used herein, radial movement is defined as movement parallel to an optical disk surface. Thus, to maintain tracking of an optical disk by the OPU, a tracking servo will command a desired radial displacement of the actuator arm. By flexing the actuator arm about an axis A, the OPU may move axially with respect to an optical disk to achieve a desired focus with regard to a projected laser beam from a lens 90. As used herein, axial movement is defined as movement transverse to an optical disk surface. Thus, to maintain focus, a focus servo will command a desired axial displacement of the actuator arm. By providing an actuator arm having these properties, a small form factor optical disk drive may be implemented. For example, the height of a disk drive incorporating this actuator arm may be as little as 10.5 mm. However, note that the OPU is aligned such that its height dimension is normal to or in the axial direction with respect to an optical disk surface. Thus, the overall achievable height reduction of such a drive architecture is limited by the thickness of the optical disk and its cartridge as well as height of the OPU (as measured from the bottom of OPU to the focused laser spot at the disk surface).

Additional height reduction may be achieved using the split-optics (which may also be denoted as a "sled-based") architecture disclosed in U.S. application Ser. No. 11/052,367, filed Feb. 7, 2005, the contents of which are hereby incorporated by reference in their entirety. As seen in FIG. 2 and in the exploded view of FIG. 3, an optical pick-up unit (OPU) 200 is attached within a sled 205. Any suitable OPU design may be used, such as that discussed in U.S. application Ser. No. 09/950,378. However, note that a height dimension H for OPU 200 now lies in the radial plane with respect to a corresponding optical disk (not illustrated). In contrast, dimension H for OPU 103 was in the axial plane, or normal to the optical disk surface. Thus, the overall height of an optical disk drive using the sled-based architecture of FIG. 2 may be substantially reduced with respect to that provided by a system incorporating the actuator arm of FIG. 1.

As is conventional in a split-optics-based architecture, coarse tracking may be achieved by movement of the sled on rails. For example, the sled may be mounted on rails (not illustrated) through apertures 210 and bearing 220. As the sled is displaced on these rails, a beam projected by a lens 340 will move radially across the optical disk (not illustrated), thereby changing track locations. In addition, the lens may be displaced by a two-dimensional actuator (not illustrated) that may either radially or axially displace the lens with respect to the optical disk as necessary for fine tracking and focusing purposes. With respect to focusing, the lens acts in the far field in that it is many wavelengths removed from the corresponding optical disk. There is a limit to the effective numerical aperture that can be obtained in such a system. In turn, this limit places a limit on the achievable data density on the corresponding optical disk, a limit that is exacerbated in a small form factor system.

To address the need in the art for improved small form factor optical disk drives, a SIL-based drive is disclosed in U.S. application Ser. No. 11/148,140. The focused spot size is reduced because the focused spot is formed inside a SIL having an index of refraction n. For example, the SIL may be implemented using a high index of refraction material such as GaP, which has an index of refraction (n) of 3.3 at the red light wavelength used in conventional DVD players. Note that the areal data density in inversely proportional to the squared value of the spot size, which is proportional to $n^2$ for a type of SIL that may be denoted as a "simple" SIL. A simple SIL comprises a sphere sliced at it's midpoint to form a hemisphere. A simple SIL formed from GaP having an index of refraction of 3.3 provides over an order of magnitude data capacity gain with respect to a conventional far field optical disk drive operating at the same wavelength. The data capacity gain may be further increased using a type of SIL lens that may be denoted as a "super" SIL. Whereas a simple SIL comprise a hemisphere, a "super" SIL may be formed by slicing a sphere of radius r and index n at a distance (r/n) below it's mid point diameter such that a beam converging toward a point at a distance (r/n) below the mid point is focused to the (r/n) point without introducing aberrations. The spot size is proportional to $n^4$ in a super SIL. Thus, a super SIL formed from GaP having an index of refraction of 3.3 provides over two orders of magnitude data capacity gain with respect to a conventional far field optical disk drive operating at the same wavelength.

Regardless of whether a SIL or super SIL is used to reduce the focused spot size, the resulting solid immersion lens must be carefully aligned with an objective lens. For example, a spacer-based approach to mount an objective lens 410 to a SIL 400 etched from a wafer 405 combination is illustrated in FIG. 4. The objective lens is mounted within flanges 411 to a spacer 415 having a conical aperture. The wafer is aligned with the spacer such that the SIL is centered in the conical aperture. The objective lens refracts light such that each light ray 420 arrives substantially normally to the hemispherical surface of the SIL. In this fashion, the SIL simply functions not to refract the light rays but to provide a higher index of refraction. It will be appreciated, however, that an aspheric SIL may also be implemented. In general, rather expensive positioning equipment is necessary to ensure the proper alignment of the SIL/spacer/objective lens combination. Once the desired optical alignment is achieved the spacer/flange and wafer/spacer interfaces may be secured using optical adhesive. The resulting SIL/objective lens assembly may then be mounted for example, as the lens 340 in the sled of FIG. 2. Although an advantageously compact and high-density storage engine may then be achieved, the alignment of the SIL and objective lens introduces manufacturing cost. As an alternative to a separate objective lens/SIL combination, the wafer may be etched such that a hybrid solid immersion/objective lens (SIOL) is achieved. However, the amount of sag (depth of etching required) is quite difficult to achieve for such a combination lens.

Accordingly, there is a need in the art for improved SIOL designs as well as optical storage engines that incorporate such improved lenses.

SUMMARY

In accordance with an aspect of the invention, an optical disk drive includes: a movable sled; an optical pick up unit (OPU) connected to the sled, the OPU including a laser configured to transmit a laser beam; a hybrid solid immersion objective lens configured to evanescently couple the laser beam onto the optical disk; and an actuator for moving the hybrid solid immersion objective lens (SIOL) to change a position of the evanescently coupled laser beam on the optical disk.

In accordance with another aspect of the invention, an optical disk drive includes: a rotary actuator arm having a laser for transmitting a laser beam and an objective end, the rotary actuator being mounted on an axis that as the rotary actuator rotates on the axis the objective end moves in a tracking direction with respect to an optical disk; and a hybrid solid immersion objective lens (SIOL) mounted to the objective end of the rotary actuator, the SIOL being configured to evanescently couple the laser beam from the laser source onto the optical disk, wherein the SIOL comprises an aspheric lens portion and a diffractive optical element (DOE) portion.

In accordance with another aspect of the invention, method of manufacturing a hybrid solid immersion objective lens (SIOL is provided that includes: etching a first surface of a substrate to form an aspheric lens portion and a surrounding diffractive element portion; and etching an opposing back surface of the substrate such that the opposing back surface is displaced by a desired substrate thickness from the aspheric lens portion and the surrounding diffractive element portion.

BRIEF DESCRIPTION OF THE DRAWINGS

The present invention may be better understood, and its numerous objects, features and advantages made apparent to those skilled in the art by referencing the accompanying drawings. The use of the same reference number throughout the figures designates a like or similar element.

Figure 1:
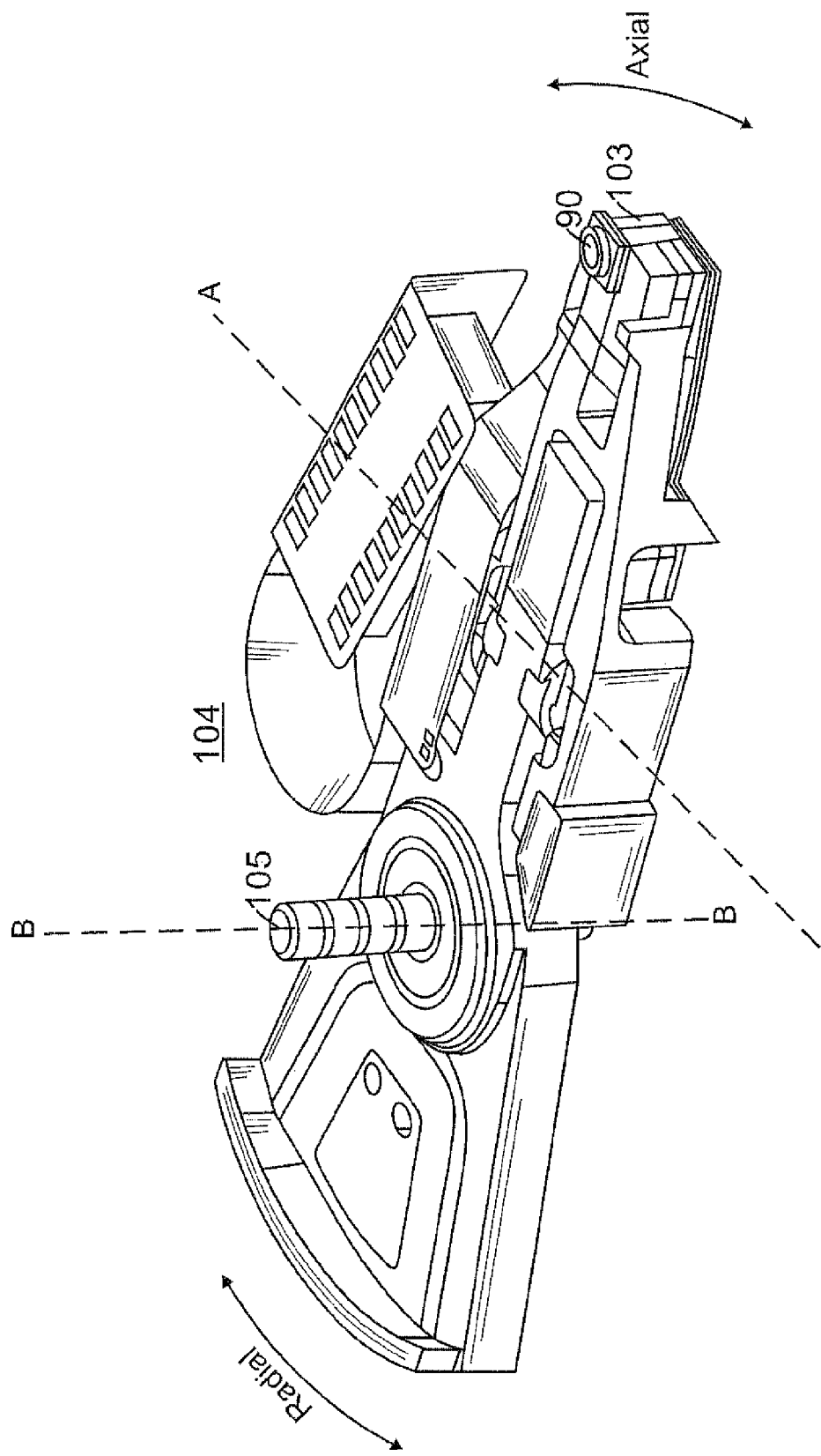
FIG. 1 is a perspective view of a rotary optical disk drive actuator arm.

While the invention is susceptible to Various modifications and alternative forms, specific embodiments thereof are shown by way of example in the drawings and will herein be described in detail. It should be understood that the drawings and detailed description thereto are not intended to limit the invention to the particular form disclosed; on the contrary, the intention is to cover all modifications, equivalents, and alternatives falling within the spirit and scope of the present invention as defined by the appended claims.

DETAILED DESCRIPTION

Reference will now be made in detail to one or more embodiments of the invention. While the invention will be described with respect to these embodiments, it should be understood that the invention is not limited to any particular embodiment. On the contrary, the invention includes alternatives, modifications, and equivalents as may come within the spirit and scope of the appended claims. Furthermore, in the following description, numerous specific details are set forth to provide a thorough understanding of the invention. The invention may be practiced without some or all of these specific details. In other instances, well-known structures and principles of operation have not been described in detail to avoid obscuring the invention.

Figure 5:
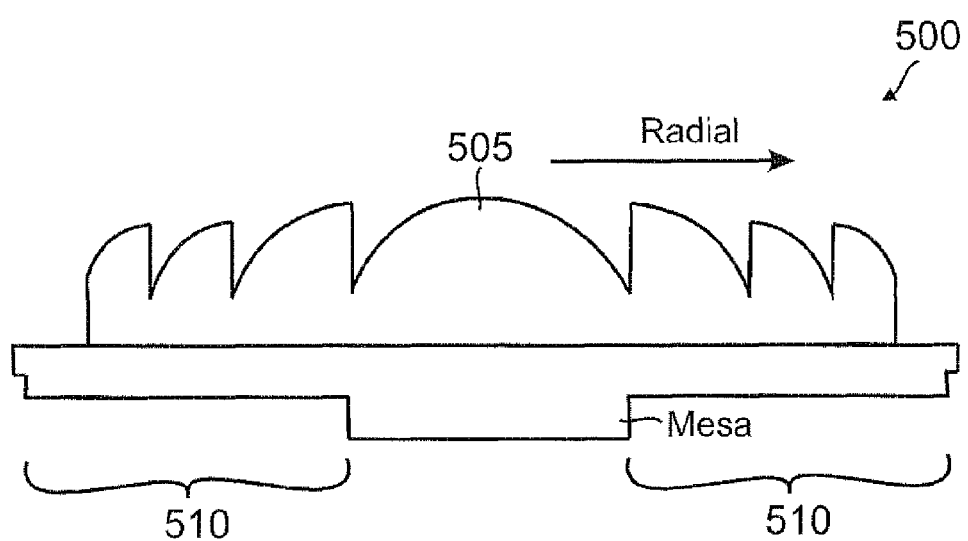
FIG. 5 is a cross-sectional view of a hybrid solid immersion objective lens (SIOL) in accordance with an embodiment of the invention.

To advance the state of the art for optical storage, a hybrid Solid Immersion/Objective Lens (SIOL) is disclosed. In this hybrid lens, a central aspheric lens portion has its circumference surrounded by a diffractive optical element (DOE) portion, such as a multi order/harmonic DOE portion. An exemplary cross-sectional view of a hybrid SIOL lens 500 having a central aspheric lens portion 505 whose circumference is surrounded by a multi-order DOE portion 510 is illustrated in FIG. 5. As those of ordinary skill in the art will appreciate, the distance between adjacent "grooves" in the DOE changes with respect to the radial distance from the center of the aspheric lens portion. In this fashion, the DOE portion mimics through diffraction what would have been produced through refraction should the aspheric portion have been extended to complete a conventional aspheric lens. In a conventional aspheric SIL, the laser light is focused into a small spot within the SIL. SIOL lens 500 produces the same spot except though a combination of refraction and diffraction. In general, the aspheric portion could be extended such that the DOE portion would play a lesser role. Similarly, the aspheric portion could be reduced such that the DOE portion plays a greater role. In general, the division between refractive and diffractive portions may be driven by the etching capabilities of the MEMS process used to etch a wafer 520 such as a GaP wafer forming the SIOL. Because the DOE portion and aspheric lens portion may be etched simultaneously using a MEMS process, the manufacture of SIOL 500 is relatively inexpensive. Moreover, the mechanical alignment difficulties of manufacturing SIL/objective lens assemblies is avoided.

The resulting SIOL can be formed such that the diameter of the combined aspheric and DOE portions is 100 microns or less. Such a "micro-SIOL" (μSIOL) provide a number of advantages. For example, a smaller number aperture (NA) is required from the objective lens function provided by the μSIOL . Thus a focusing grating coupler (FGC) OPU is enabled which is advantageous because FCGs with large NAs are difficult to manufacture. In addition, a μSIOL may be manufactured using MEMS etching techniques such that no ball grinding or similar mechanical grinding steps are required.

Although the DOE portion of the SIOL of FIG. 5 provides substantial benefits as just described, it is well known that a diffractive lens introduces substantial chromatic aberrations. For example, within the visible spectrum a diffractive lens has a chromatic aberration that is roughly seven times what a comparable refractive flint lens produces (and in opposite polarity). To correct for the chromatic effects, the DOE portion is not etched such that its grooves are one wavelength in depth but rather to a much deeper depth such as illustrated in FIG. 5 so as to operate in multiple diffractive orders. Blazing the DOE for higher diffractive orders enables the design of achromatic and apochromatic singlets. In general, a multi-order DOE may be characterized by it multiple $2\pi$ phase jumps at zone boundaries such that the depth of the grooves in the DOE is an integer p times that of a first order diffractive lens. Moreover, because the minimum feature size for an m-diffractive-order DOE responsive to the pseudo-monochromatic illumination used in optical disk drives is increased by an integer m times with regard to a first diffractive order DOE, manufacturing tolerances are also enhanced. Although the groove depth is also increased in an multi-diffractive-order DOE, the required groove depth is minimized for a high refractive lens material such as GaP, ZnSe, ZnS, Si, and Ge (typical groove depths of 4-10 microns).

Because there are there are $2\pi p$ phase jumps between zone boundaries in a multi-order DOE, the $p^{th}$ order focal length for a nominal design wavelength, $p\lambda_0$, is $f_0$. For a wavelength $\lambda$, the $m^{th}$-order focal length ($f_{m,\lambda}$) is given by the following expression:

$$f_{m,\lambda} = \frac{p\lambda_0}{m\lambda} f_0 \qquad \text{Eq. 1}$$

where m is the diffraction order and $\lambda_0$ is the design wavelength. Correction for the chromatic aberrations occurs for discrete wavelengths when the design focal length, $f_0$, coincides with $f_{m,\lambda}$ based on the following condition:

$$\frac{p\lambda_0}{m\lambda} = 1. \qquad \text{Eq 2}$$

The resulting resonant wavelengths can be calculated according to the expression:

$$\lambda = \frac{p\lambda_0}{m}. \qquad \text{Eq 3}$$

The larger the value for p, the more wavelengths that will come to a common focus over a given spectral range. Thus, chromatic dispersion significantly reduces as the parameters increases. It will be appreciated, however, that there is a tradeoff between the thickness of the DOE and the achromatic performance. The focus of any resonant wavelength is diffraction limited, which is one of the main advantages of the multi-order DOE.

Because the diffractive lenses will be manufactured using semiconductor processes, a minimum feature size WMFS of the lens should be within the resolution of the photolithography stepper. In general, is given by:

$$W_{MFS} = m*\lambda_0/NA$$

where m is the diffraction order, $\lambda_0$ is the design wavelength, and NA is the required numerical aperture. Because the focal length is inside the lens, the effective NA should be used to determine the minimum feature size. The effective $NA_e$ is defines as:

$$NA_e = n \sin u'$$

where n is the refractive index of the lens material (for example, GaP has an index of refraction $n_{GaP}$ of 3.29 at a wavelength of 645 nm) and u' is the angle that the marginal ray makes in the material given by the objective numerical aperture (NA). Given an objective NA of 0.48, the effective NA is 1.58 resulting in a minimum feature size of 0.414 microns for a first order diffractive lens. Such a small feature size may be expensive to manufacture. Thus, a less expensive and more readily implemented manufacture is obtained if the minimum feature size is 3 microns. Moreover, for high diffraction efficiencies, the minimum feature size should be at least 7 microns. Thus, in one embodiment, an exemplary μSIOL has a diffraction order m of 20 to achieve a numerical aperture NA of 0.48. Similarly, in another embodiment, an exemplary μSIOL has a diffraction order m of 30 to achieve a number aperture NA of 0.85. Given the preceding equations, a minimum feature size for the 0.48 NA embodiment may be around 8.2 microns whereas a minimum feature size for the 0.86 NA embodiment may be around 7 microns. Another design consideration is an etch depth d, which is determined by the wavelength, the diffraction order m, and the refractive index n of the material as follows:

$$d=m\lambda/(n-1)$$

Given this relationship for etch depth, the 20$^{th}$ order μSIOL just described would have an etch depth of around 5.7 microns whereas the 30$^{th}$ order μSIOL would have an etch depth of around 8.5 microns.

The manufacture of an exemplary μSIOL will now be discussed. A plurality of μSIOLs may then be etched on a first surface of the GaP wafer using for example, a grayscale mask. As opposed to traditional "stair-step" approximations of optical surfaces in MEMs processes, a grayscale process can produce the exact shape desired. After the μSIOLs have been etched, the wafer may be thinned by etching the opposing back surface of the wafer. Alternatively, a chemical-mechanical polishing may be performed to thin the wafer. The wafer thickness may be checked using, for example, interferometric testing. When the wafer has been thinned to the desired thickness, mesas (illustrated in FIG. 5) may be etched on the back surface such that each mesa is centrally aligned with a location of a corresponding μSIOL on the first surface. For example, a 25 micron square mesa may be etched for each μSIOL. The purpose of each mesa is to minimize the possibility of contact between the μSIOL and a corresponding optical disk by reducing the area that is maintained very close to the media.

To assist in the alignment of the mesas with the corresponding μSIOLs, an accurate front-to-back alignment mark process may be used. In this fashion, the mesa structure may be accurately aligned and registered relative to features on the front side of the wafer within a few microns (such as +/−2 μm). The μSIOLs may then be antireflection (AR) coated. The completed μSIOLs may then be diced from the wafer. Additional suitable wafer etching processes are described in commonly-assigned U.S. Pat. No. 6,914,724, the contents of which are incorporated by reference.

Figure 2:
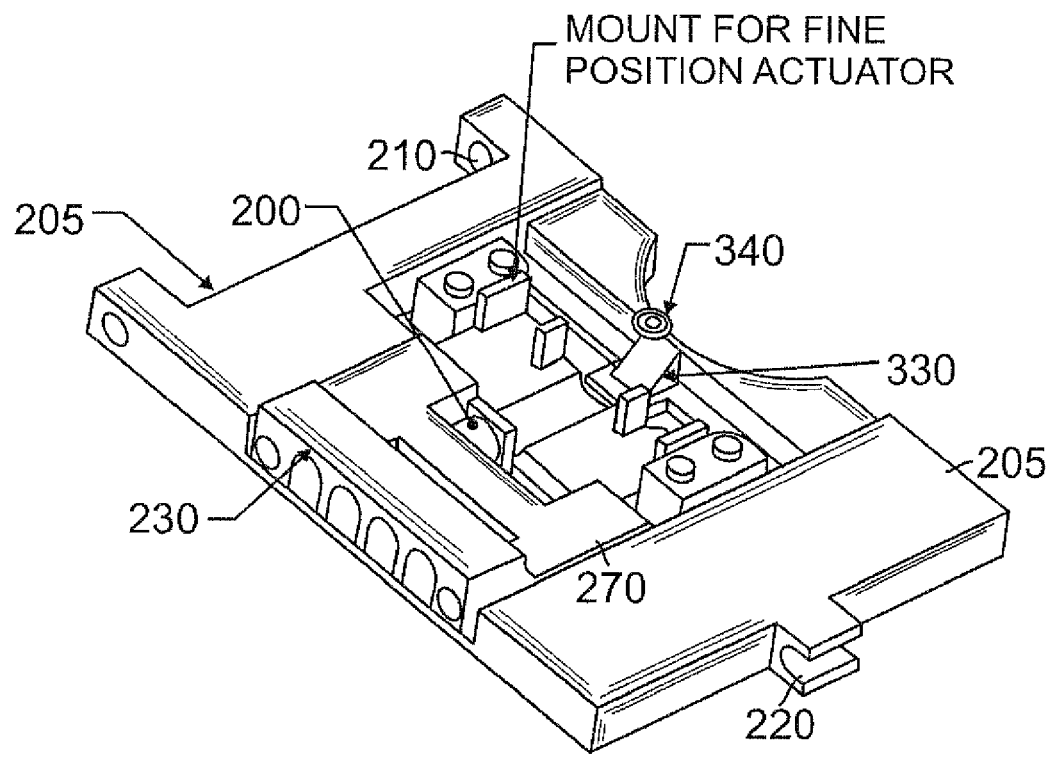
FIG. 2 is a perspective view of a sled-mounted OPU in accordance with an embodiment of the invention.
Figure 3:
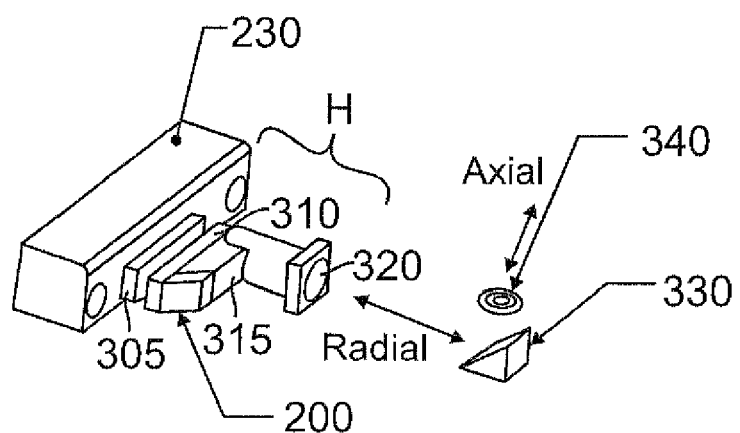
FIG. 3 illustrates the orientation of the OPU, turning mirror, and the lens of FIG. 3.
Figure 4:
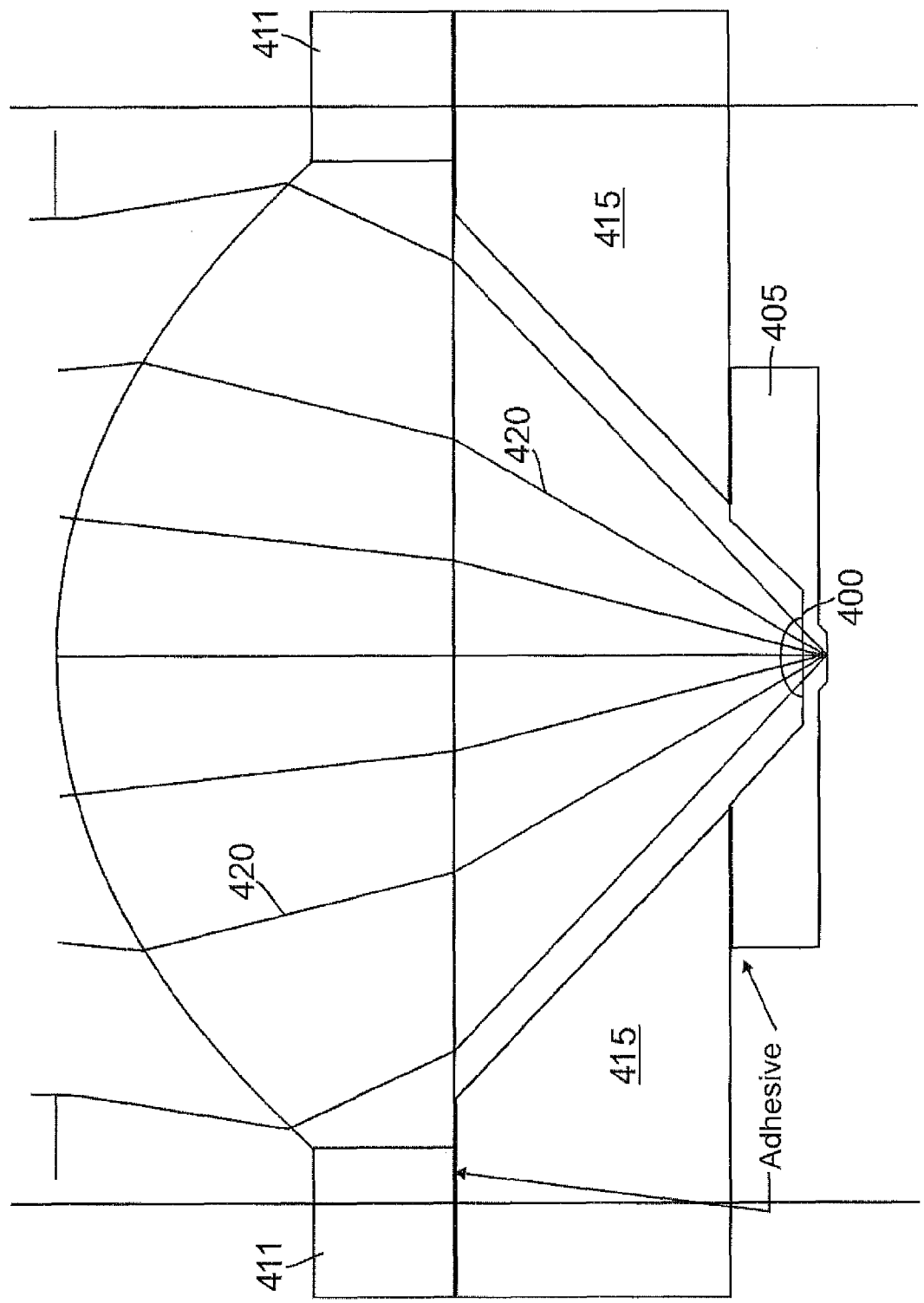
FIG. 4 illustrates a SIL/objective lens mounting using a sleeve tube in accordance with an embodiment of the invention.

Small-form-factor-μSIOL-based optical disk drives may be constructed using rotary actuator arms such as that discussed with respect to FIG. 1 and also the sled-based architecture discussed with respect to FIGS. 2 and 3. For example, in a sled-based architecture, lens 340 of FIGS. 2 and 3 may comprise a μSIOL as seen in FIG. 5. With respect to a rotary arm embodiment, referring again to FIG. 1, a lens 90 in a rotary actuator arm embodiment may comprise a μSIOL. In a sled-based embodiment, it will be appreciated that the OPU may be configured within the sled such that the laser beam is projected normally towards the disk surface rather than parallel to the disk surface as seen in FIG. 4. In such an embodiment, the necessity of turning mirror 330 is removed.

The laser diode in the OPU will generate a certain amount of heat, which can lead to undesired thermal degradation of components within the OPU. In general, the limitation on the heat flow from the laser diode is the ability to transfer heat from the sled to the air cavity surrounding the sled in the optical disk drive, and from this air cavity to the housing of the optical disk drive. It is believed that nano-texturing the baseplate and the sled with carbon nanotubes will enhance this heat conduction. Other heat sources within the disk drive such as the spindle motor and ASICs may also benefit from such nano-texturing.

Actuation of the μSIOL for fine tracking purposes may be achieved using conventional sled-based actuators in a sled-based embodiment. Moreover, although a gap servo is implemented to control the gap thickness between the disk and the μSIOL, a fine focus servo may also be implemented. Advantageously, an "all digital servo" architecture may be implemented such as described in U.S. Ser. No. 09/950,378. Regardless of whether a rotary actuator arm or a sled-based architecture is used, the resulting optical disk drive is adapted such that an optical path length is as follows.

Referring back to FIG. 3, for example, a laser diode (not illustrated) included within OPU 300 on silicon submount 305 will have an output power that consists of a series of lasing modes separated by a characteristic spacing given as:

$$\Delta\lambda=\lambda^2/2nL$$

where λ equals the average output wavelength, n is the index of refraction in the laser active region of the laser diode, and L is the length of the laser cavity. This spacing of Δλ drives a spacing ΔL of the coherence function for the laser beam from OPU 300, which equals:

$$\Delta L=\lambda^2/\Delta\lambda=2nL$$

Should λ equal 654 mn, the index of refraction n equal 4.23, and L equal 350 nm, ΔL becomes approximately 3 mm. The coherence function depends upon the roundtrip optical path length (OPL) from the laser to the media and back to the laser, which may also be referred to as the optical path difference (OPD) of the light reentering the laser, i.e, feedback light, and the light inside the laser cavity. The roundtrip optical path length is defined by the roundtrip distance the laser beam takes from the laser diode through the OPU and the μSIOL to the information layer of the optical disk being read or written to. Those of ordinary skill in the art will appreciate that the OPL/OPD does not exactly correspond to the physical distance of such a path but must also account for the relative indices of refraction in the objects along this path.

The strength of maxima in the coherence function versus the OPL/OPD is a function of the laser linewidth, i.e, the width of a single lasing mode. The broader the linewidth, the more rapidly the maxima diminish versus OPL/OPD. Thus, as the form factor of an optical disk drive is decreased, the maxima in the coherence function become more problematic causing an increase in the laser feedback noise effects and increased interference phenomena from stray light and ghost reflections in the OPU.

In general, a typical laser diode has a cavity length of between approximately 100 and 1000 μm. The effective index of refraction for the cavity for wavelengths used in DVD-type devices is typically around 4.23. Thus, the spacing ΔL for achievable coherence functions will generally range between about 850 um to about 8500 um. Referring back to FIG. 3, movement of the sled on its rails for coarse tracking should not affect the optical path length assuming that the optical disk axial runout is within acceptable tolerances. Moreover, the gap servo will not significantly affect the optical path length. Thus, OPU 300 may be mounted on the sled such that the median optical path length lies between coherence function maxima, preferably substantially at a midpoint between adjacent maxima. Thus, given that the maximum optical path length variation will be very small, the avoidance of coherence function maxima is assured. The same considerations would apply to the optical path length in a rotary-actuator based embodiment.

Regardless of whether a rotary or sled-based actuator is used, a gap servo drives the actuation of the μSIOL such that the desired gap is maintained between the μSIOL and the corresponding optical disk. The gap servo serves to maintain the amount of light reflected from the μSIOL/air interface at a fixed value. This interface acts as a beam splitter to reflect the portion of the total internal reflection (TIR) light that is not evanescently coupled through frustrated TIR (FTIR) to the optical media. The reflected TIR light has a significant phase shift as compared to the FTIR light such that a polarization state difference allows it to be separated from the FTIR light. The reflected FTIR light may then be split off in the OPU to a separate photosensor(s) that provide a gap error signal. The gap servo drives the actuation of the μSIOL to maintain the gap error signal at a desired value (and hence keep the gap separation at a desired value). It has been discovered that a gap spacing of between 40 and 80 nm provides adequate signal strength yet minimizes ablation of the media surface.

Although the invention has been described with respect to particular embodiments, this description is only an example of the invention's application and should not be taken as a limitation. For example, the wavelengths, numerical apertures, disk capacity and topology, and other factors specifically described herein are merely exemplary. Consequently, the scope of the invention is set forth in the following claims.

We claim:

1. An optical disk drive, comprising:
   a movable sled;
   an optical pick up unit (OPU) connected to the sled, the OPU including a laser configured to transmit a laser beam;
   a hybrid solid immersion objective lens configured to evanescently couple the laser beam onto the optical disk; and
   an actuator for moving the hybrid solid immersion objective lens (SIOL) to change a position of the evanescently coupled laser beam on the optical disk, wherein the laser has a coherence function that depends upon a roundtrip optical path length of the laser beam, the coherence function having coherence value maxima spaced apart by intervals, and wherein the disk drive is configured so that the roundtrip optical path length of the laser beam is within one of the intervals.

2. The optical disk drive of claim 1, wherein the disk drive is configured such that the optical path length is located substantially in the middle of the one interval.

3. The optical disk drive of claim 1, wherein the OPU is configured within the sled so as to project the laser beam parallel to the laser disk surface, the optical disk drive further comprising a turning means for redirecting the parallel-directed laser beam to the SIOL.

4. The optical disk drive of claim 3, wherein the SIOL has a diameter of less than 100 microns and the turning means comprises a focusing grating coupler.

5. The optical disk drive of claim 1, wherein the SIOL is etched from a substrate.

6. The optical disk drive of claim 5, wherein the substrate is a GaP substrate.

7. The optical disk drive of claim 6, wherein the SIOL comprises an aspheric lens portion and a diffractive optical element (DOE) portion.

8. The optical disk drive of claim 7, wherein the DOE portion is a multi-diffractive-order DOE portion.

9. An optical disk drive, comprising:
   a rotary actuator arm having a laser for transmitting a laser beam and an objective end, the rotary actuator being mounted on an axis that as the rotary actuator rotates on the axis the objective end moves in a tracking direction with respect to an optical disk; and
   an hybrid solid immersion objective lens (STOL) mounted to the objective end of the rotary actuator, the SIOL being configured to evanescently couple the laser beam from the laser source onto the optical disk, wherein the SIOL comprises an aspheric lens portion and a diffractive optical element (DOE) portion, wherein the laser has a coherence function that depends upon a roundtrip optical path length of the laser beam, the coherence function having coherence value maxima spaced apart by intervals, and wherein the disk drive is configured so that the roundtrip optical path length of the laser beam is within one of the intervals.

10. The optical disk drive of claim 9, wherein the disk drive is configured such that the optical path length is located substantially in the middle of the one interval.

* * * * *